United States Patent [19]

Hanks

[11] Patent Number: 4,635,768
[45] Date of Patent: Jan. 13, 1987

[54] CLUTCH HAVING AN OUTPUT WITH BREAK AWAY CONNECTION

[75] Inventor: James V. Hanks, Robbinsdale, Minn.

[73] Assignee: Horton Manufacturing Co., Inc., Minneapolis, Minn.

[21] Appl. No.: 693,190

[22] Filed: Jan. 22, 1985

[51] Int. Cl.<sup>4</sup> .............................................. F16D 9/00
[52] U.S. Cl. .............................. 192/30 W; 192/110 B; 384/126; 384/627; 464/10
[58] Field of Search ............ 192/30 W, 110 R, 110 B, 192/98, 67 R, 56 R; 464/10; 384/126; 308/1 R, 1 A; 474/199

[56] References Cited

U.S. PATENT DOCUMENTS

| | | | |
|---|---|---|---|
| 2,657,557 | 11/1953 | Young | 192/110 R |
| 2,907,432 | 10/1959 | Strickland et al. | 403/1 X |
| 3,760,916 | 9/1973 | Hanks et al. | 192/67 R |
| 3,818,722 | 6/1974 | Vogel | 464/10 X |
| 4,058,353 | 11/1977 | Frommlet et al. | |
| 4,370,106 | 1/1983 | Lauterbach | 384/126 |

Primary Examiner—George H. Krizmanich
Attorney, Agent, or Firm—Peterson, Wicks, Nemer & Kamrath

[57] ABSTRACT

A fail-safe device for preventing undesired rotation of the output as the result of bearing failure and seizure is shown according to the teachings of the present invention in its most preferred form for use with a clutch engagable in a single driving position. In its most preferred form, the output includes a hub portion which is rotatably mounted to the input of the clutch by a bearing. The output of the clutch further includes a collar portion for receipt upon the hub portion and forming a break away connection therebetween. The driven portion of selectively rotationally interrelating members of the clutch, i.e., teeth in the preferred embodiment shown, is located on the collar portion of the output. Under normal operation and without bearing failure, the collar and hub portions of the output have the same relative rotational position and rotate as a single unit. However, in the event of bearing failure and seizure and assuming the output is not clutched in with the input, relative rotation is allowed between the hub portion and the collar portion of the output to prevent undesired rotation of the machinery or other apparatus connected to the output of the clutch.

19 Claims, 1 Drawing Figure

CLUTCH HAVING AN OUTPUT WITH BREAK AWAY CONNECTION

BACKGROUND

The present invention relates generally to fail-safe devices for bearing failures and more particularly to fail-safe devices for control apparatus which prevent undesired rotation in the event of bearing failure and seizure.

During normal use and operation of control apparatus of various types, various components wear and are prone to fail due to this wear. One such component is the bearings provided in such control apparatus. Bearings are provided for allowing rotation between a first member and a second member such as between a drive shaft and a rotatable hub to be driven by such shaft. However, bearings are prone to wear and failure from use. Bearings may seize during such a failure resulting in undesired mutual rotation of the members of the control apparatus. Such undesired mutual rotation may cause damage to the machinery which the apparatus controls, the work piece which is being operated upon by such machinery, and/or the personnel operating or attempting to repair or maintain such machinery. Thus, a need has arisen for fail-safe devices for preventing undesired mutual rotation of members rotatably mounted to each other by bearings as a result of bearing failure.

SUMMARY

The present invention solves this need and other problems by providing a fail-safe device including a hub portion and a collar portion having a break away connection therebetween in its most preferred form. The hub portion is rotatably mounted to a second member of the control apparatus by a bearing. The collar portion includes a driven portion which selectively interrelates with the second member for rotatably relating the collar portion in or out of rotation with the second member. In the event of bearing failure and seizure and with the collar portion clutched out of rotation with the second member, relative rotation occurs between the collar portion and the hub portion due to the break away connection therebetween such that the machinery or other apparatus being controlled by the control apparatus is not undesireably driven as the result of seizure of the hub portion to the drive member due to bearing failure.

Thus, it is an object of the present invention to provide a fail-safe device for control apparatus in the event of bearing failure.

It is further an object of the present invention to provide such a novel fail-safe device which can be easily manufactured and assembled.

It is further an object of the present invention to provide such a novel fail-safe device which does not increase the size of the control apparatus in which it is utilized.

It is further an object of the present invention to provide such a novel fail-safe device which does not prevent operation of the control apparatus.

It is further an object of the present invention to provide such a novel fail-safe device which does not provide a path for power flow that can bypass the clutching or torque transferring interface in the event of bearing failure.

It is further an object of the present invention to provide such a novel fail-safe device utilized in a single position clutch with which the input and output always come to the same degree of registry for rotation of the output.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
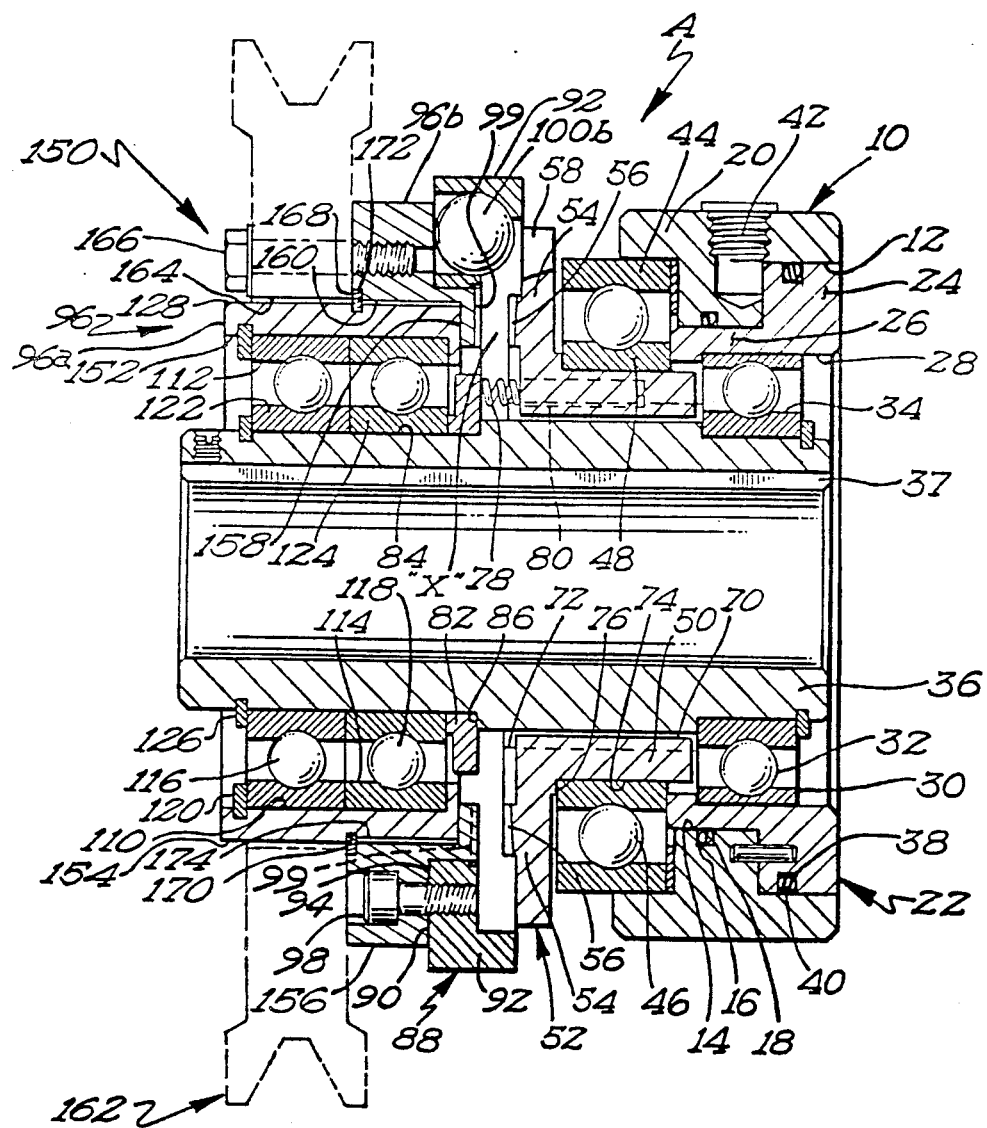
FIG. 1 shows a cross sectional view of a bearing fail-safe device according to the preferred embodiment of the teachings of the present invention utilized in a single position fluid operated clutch of the type shown and described in U.S. Pat. No. 3,760,916.

The FIGURE is drawn for ease of explanation of the basic teachings of the present invention only; the extensions of the figure with respect to number, position, relationship, and dimensions of the parts to form the preferred embodiment or preferred use will be explained or will be within the skill of the art after the following teachings of the present invention have been read and understood. Further, the exact dimensions and dimensional proportions to conform to specific force, weight, strength, use, and similar requirements will likewise be within the skill of the art after the following teachings of the present invention have been read and understood.

Where used in the FIGURE of the drawings, the same numerals designate the same or similar parts. Furthermore, when the terms "first", "second", "inside", "outside", "inward", "outward", and similar terms are used herein, it should be understood that these terms have reference only to the structure shown in the drawings as it would appear to a person viewing the drawings and are utilized only to facilitate describing the invention.

DESCRIPTION

A bearing fail-safe device according to the teachings of the present invention is shown in the drawings in its most preferred form in combination with a single position fluid operated clutch A of the type shown and described in U.S. Pat. No. 3,760,916 and is generally designated 150. For purpose of explanation of the basic teachings of the present invention, the same numerals designate the same or similar parts in the present FIGURE and the FIGURES of U.S. Pat. No. 3,760,916. The description of the common numerals and the single position fluid operated clutch A may be found herein and in U.S. Pat. No. 3,760,916, which is hereby incorporated herein by reference.

In its most preferred form, bearing fail-safe device 150 includes mount 96 which includes a first hub portion 96a and a second, collar portion 96b. In the preferred embodiment, hub portion 96a is generally cylindrical in construction including an inner surface 152 and an outer surface 154. Inner surface 152 includes annular recess 110 in which outer races 112 and 114 are press fit and held therein by lock ring 120.

In the preferred embodiment, collar portion 96b is generally annular in construction including a cylindrical portion 156 and a radially extending portion 158 extending from the axially inward end of cylindrical portion 156. Portion 156 includes an inner surface 160 having a size and shape complementary to and for receipt on surface 154 of hub portion 96a. Particularly, according to the teachings of the present invention surface 160 has a size and shape relative to surface 154 to form a break away connection between hub portion 96a and collar portion 96b forming mount 96. Specifically, hub portion 96a will maintain the same relative rotational position as collar portion 96b unless a torque force is applied to hub portion 96a which is not simultaneously applied to collar portion 96b such as in the case of bearing failure and seizure. In that event, portions 96a and 96b will break away and relative rotation will occur between hub portion 96a and collar portion 96b.

Collar portion 96b further includes recess 94 into which ball carrier ring 88 is secured for mounting balls 100b, 102b, 104b, 106band 108b. Teeth 99 are provided on the axially inward end of collar portion 96b generally extending from recess 94 through the radially inward end of portion 158.

In its most preferred use, clutch A further includes a sheeve 162 having an inner opening 164 having a size and shape complementary to and for receipt on surface 154 of portion 96a. Sheeve 162 is held in the same rotational position as collar portion 96b by bolts 166 axially extending through sheeve 162 into the axially outward end of collar portion 96b.

In the preferred embodiment of the present invention, sheeve 162 and collar portion 96b are held on hub portion 96a by the abutment of portion 158 with the axially inward end of hub portion 96a and by a snap ring 168 captured in a groove 170 formed in surface 154 and received in a recess 172 formed in the axially outward end of collar portion 96b. Snap ring 168 may be further axially captured in recess 172 when sheeve 162 abuts with axially outward end of collar portion 96b.

According to the teachings of the present invention, device 150 further includes provisions 174 allowing relative rotation of sheeve 162 and collar portion 96b with respect to hub portion 96a and for reducing the frictional interaction therebetween if and when bearings 116 and 118 should wear and/or fail and seize mount 96. In its most preferred form, provisions 174 is a bronze or iron solid film lubricant. In its most preferred form, provisions 174 is secured to collar portion 96b to prevent relative rotation therebetween and is not connected to hub portion 96a to allow relative rotation therebetween for purposes to be explained further hereinafter.

In operation, assuming bearings 116 and 118 are operating as designed and specifically seizure has not occurred, clutch A including fail-safe device 150 according to the present invention operates in the same manner as clutch A described in U.S. Pat. No. 3,760,916, the description of which is hereby incorporated by reference. Particularly hub portion 96a and collar portion 96b and ring 88 and balls 100b, 102b, 104b, 106b, and 108b are in the same rotational position and form a single mount 96. It can then be appreciated that the rotational positions of portions 96a and 96b and hub 36 are dependent on the position of piston 22.

However, if bearings 116 and 118 should fail for any reason and should seize within recess 110, the rotational position of portions 96a and 96b forming mount 96 is dependent on the position of piston 22. Particularly, if piston 22 is not actuated in its most preferred form such that springs 78 separate teeth 56 and 99, portion 96a will rotate with hub 36 due to bearing failure causing undesirable torque transfer; however, portion 96b, and sheeve 162 attached thereto will be rotationally independent from portion 96a and hub 36 due to the division of mount 96 into separate component portions 96a and 96b preventing undesirable torque transfer between portions 96a and 96b and thus between hub 36 and sheeve 162 and also due to the rotational interface provisions 174.

Thus, it can be appreciated that undesired rotation of sheeve 162 as the result of bearing failure is prevented utilizing device 150 according to the teachings of the present invention. This is especially important in clutches of the type and/or variety of U.S. Pat. No. 3,760,916 where specific rotation positions are desired between hub 36 and sheeve 162. Further, the unexpected and often catastrophic running of machines when bearings fail possibly damaging the machine, the work piece in the machine or body portions of the operator located in the machine controlled by the clutch is prevented.

A subtle feature of the present invention can now be specifically set forth and appreciated. Specifically, it should be appreciated that teeth 99 and total force transfer between the clutch components occurs through portion 96b and the major function of portion 96a is a carrier for portion 96b.

Furthermore, provisions 174 provide a further degree of safety in addition to the break away connection provided between portions 96a and 96b according to the teachings of the present invention. Specifically, as bearings 116 and 118 begin to wear and fail, less power is transferred between collar portion 96b and hub portion 96a. Therefore, collar portion 96b will slip on hub portion 96a due to the reduction of frictional interaction provided by provisions 174. Thus, an early warning is provided that bearings 116 and 118 are wearing and should be replaced before complete failure and seizure. Thus, fail-safe device 150 according to the teachings of the present invention provides a safety valve to control apparatus A by first providing a visual indication of wear to allow bearing replacement before failure and further to provide protection against power flow that bypasses the clutching interface in the event of bearing failure.

Now that the basic teachings of the present invention have been explained, many extensions and variations will be obvious to one having ordinary skill in the art. For example, although device 150 has been described in its most preferred embodiment with a clutch of the type and variety of U.S. Pat. No. 3,760,916 which provides selective torque transfer between an input or second member shown in the preferred form as a driven shaft received in hub 36 and drive ring 52 and an output or first member shown in the preferred form as sheeve 162, and ball carrier ring 88, and mount 96, device 150 may be utilized in other types and varieties of clutches and other apparatus and constructions which provides selective torque transfer between first and second members. For example, clutches may be either fluid, spring, electrically, or otherwise actuated. Likewise, device 150 may be utilized in clutches which are engageable in two or more driving positions or in random driving positions. Further, device 150 may be utilized with other selectively rotationally relating surfaces of the clutch components other than teeth 56 and 99 as shown in the most preferred form of the present invention. For example, device 150 may be utilized in control apparatus including friction disks and rings or other types of frictionally interrelating surfaces.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Clutch for selectively rotationally interrelating an input and an output in designated driving positions with which the input and output always come to the same degrees of registry for rotation of the output comprising, in combination: a hub for mounting a driven shaft; a drive ring slidably mounted on said hub and rotatable thereby; said drive ring formed with a multiplicity of projection-receiving tapered cavities; said drive ring having teeth formed thereon and radially within said projection-receiving cavities, with said hub and drive ring forming the input of the clutch; a hub portion; at least one bearing, with the hub portion being rotatably mounted by the bearing to the hub of the input; a collar portion; means for forming a break away connection between the hub portion and the collar portion where the same relative rotational position is maintained between the hub portion and the collar portion unless a torque force is applied to the hub portion which is not simultaneously applied to the collar portion in which event relative rotation is allowed between the hub portion and the collar portion; said collar portion including a projection carrier ring having a multiplicity of projections mounted thereon adjacent the periphery thereof for engagement with said cavities of said drive ring; said projection carrier ring having teeth formed thereon radially within said projections for engagement with the teeth of said drive ring, with the collar portion, the hub portion, and the projection carrying ring comprising the output of the clutch; and means for urging said drive ring axially on said hub for engagement of said cavities thereof with said projections of said carrier ring as said teeth of said drive ring engage the teeth of said projection carrier ring to thereby rotate said collar portion carrying said projection carrier ring and under normal operation when the bearings allow relative rotation between the hub of the input and the hub portion of the output, the collar portion and hub portion have the same relative rotational position and under operation when the bearings have failed and seized, relative rotation occurs between the hub portion and the collar portion when the input and output are not rotationally interrelated by the engagement of the teeth of the drive ring and the projection carrier ring.

2. The designated driving positions clutch of claim 1 further comprising, in combination: means for reducing the frictional interaction between the hub portion and the collar portion of the output in the event that relative rotation occurs therebetween as the result of bearing wear.

3. The designated driving positions clutch of claim 2 wherein the frictional interaction reducing means comprises a solid film lubricant.

4. The designated driving positions clutch of claim 3 wherein the output further comprises, in combination: a sheeve held in the same rotational position as the collar portion of the output.

5. The designated driving positions clutch of claim 4 wherein the projections and cavities are arranged so that in one position the projections overlie the cavities for registry and in any other position at least three projections form a triangle containing the axis of the clutch and engage portions of the member between the cavities.

6. In an apparatus for controlling rotation between a first member and a second member, with the first member being rotatably mounted with respect to the second member by at least one bearing, with the rotation control apparatus including means for selectively rotationally interrelating the first and second members, with the improvement comprising a fail-safe device for preventing undesired rotation of the first member with the second member as the result of bearing failure and seizure, with the fail-safe device comprising, in combination: a hub portion, with the hub portion being rotatably mounted by the bearing to the second member; a collar portion; means for forming a break away connection between the hub portion and the collar portion where the same relative rotational position is maintained between the hub portion and the collar portion unless a torque force is applied to the hub portion which is not simultaneously applied to the collar portion in which event relative rotation is allowed between the hub portion and the collar portion, with the selectively rotationally interrelating means including a driven portion interconnected to the collar portion, with the collar portion and the hub portion comprising the first member and under normal opertaion when the bearings allow relative rotation between the first and second members, the collar portion and hub portion have the same relative rotational position and under operation when the bearings have failed and seized, relative rotation occurs between the hub portion and the collar portion when the first and second members are not rotationally interrelated by the selectively rotationally interrelating means.

7. The fail-safe device of claim 6 further comprising, in combination: means for reducing the frictional interaction between the hub portion and the collar portion of the first member in the event that relative rotation occurs therebetween as the result of bearing wear.

8. The fail-safe device of claim 7 wherein the frictional interaction reducing means comprises a solid film lubricant.

9. The fail-safe device of claim 8 wherein the solid film lubricant is formed of bronze.

10. The fail-safe device of claim 6 wherein the first member further comprises, in combination: a sheeve held in the same rotational position as the collar portion of the first member.

11. The fail-safe device of claim 6 wherein the selectively rotationally interrelating means comprises, in combination: a drive ring slidably mounted on the second member; and means for reciprocating the drive ring between a first position which rotationally interrelates the drive ring of the second member with the driven portion of the collar portion of the first member and a second position which rotationally isolates the drive ring of the second member from the driven portion of the collar portion of the first member.

12. The fail-safe device of claim 11 wherein the drive ring of the second member is spaced from the driven portion of the collar portion of the first member in the second position of the drive ring.

13. The fail-safe device of claim 11 wherein the reciprocation means comprises, in combination: means for biasing the drive ring in one of its first and second positions; and piston means for moving the drive ring to the other of its first and second positions against the biasing means.

14. The fail-safe device of claim 6 wherein the selectively rotationally interrelating means comprises means for selectively rotationally interrelating the first and second members in designated driving positions and which the first and second members always come to the same degrees of registry for rotation of the first member.

15. The fail-safe device of claim 14 wherein the selectively rotationally interrelating means comprises, in combination: a drive ring reciprocally mounted on the second member between a first position which rotationally interrelates the drive ring of the second member with the driven portion of the collar portion of the first member and a second position which rotationally isolates the drive ring of the second member from the driven portion of the collar portion of the first member; a multiplicity of projection-receiving cavities formed on one of the first member and the second member; and a multiplicity of projections mounted to the other of the first and second members for engagement with the projection-receiving cavities.

16. The fail-safe device of claim 15 wherein the projections and cavities are arranged so that in one position the projections overlie the cavities for registry and in any other position at least three projections form a triangle containing the axis of the clutch and engage portions of the member between the cavities.

17. The fail-safe device of claim 15 wherein the angles between a certain projection and its corresponding cavity and the successive projections and cavities are substantially 0°, 40°, 170°, 190°, and 250°.

18. The fail-safe device of claim 15 wherein the drive ring of the second member includes intermeshing teeth which intermesh with teeth formed on the collar portion of the first member.

19. The fail-safe device of claim 15 wherein the multiplicity of projections comprises, in combination: a multiplicity of balls mounted by a ball carrier member.

* * * * *